Dec. 17, 1968  F. E. MORSE, JR  3,416,834
COVER CONSTRUCTION FOR OPEN BODY TRUCKS
Filed April 3, 1967
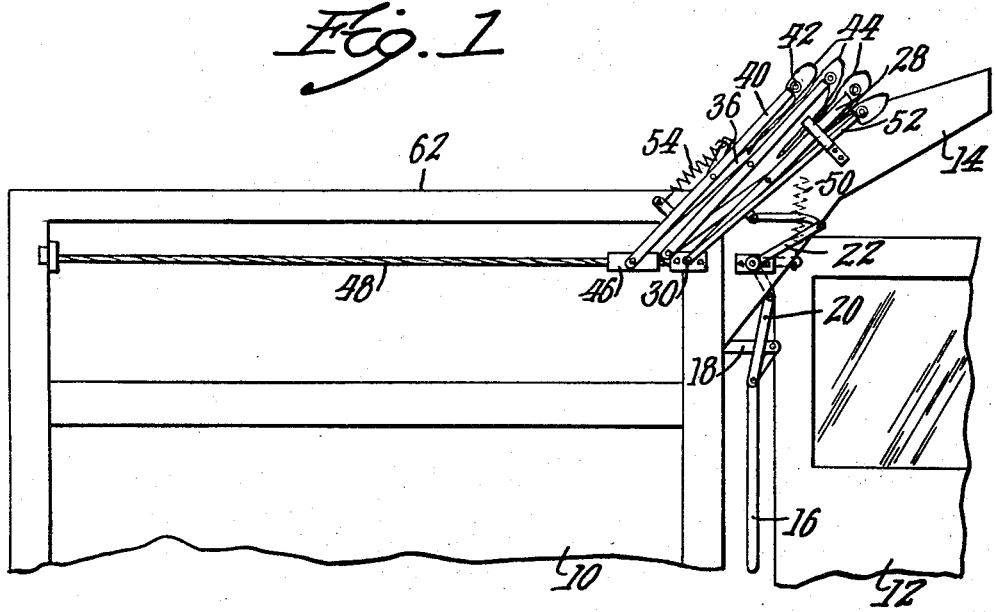
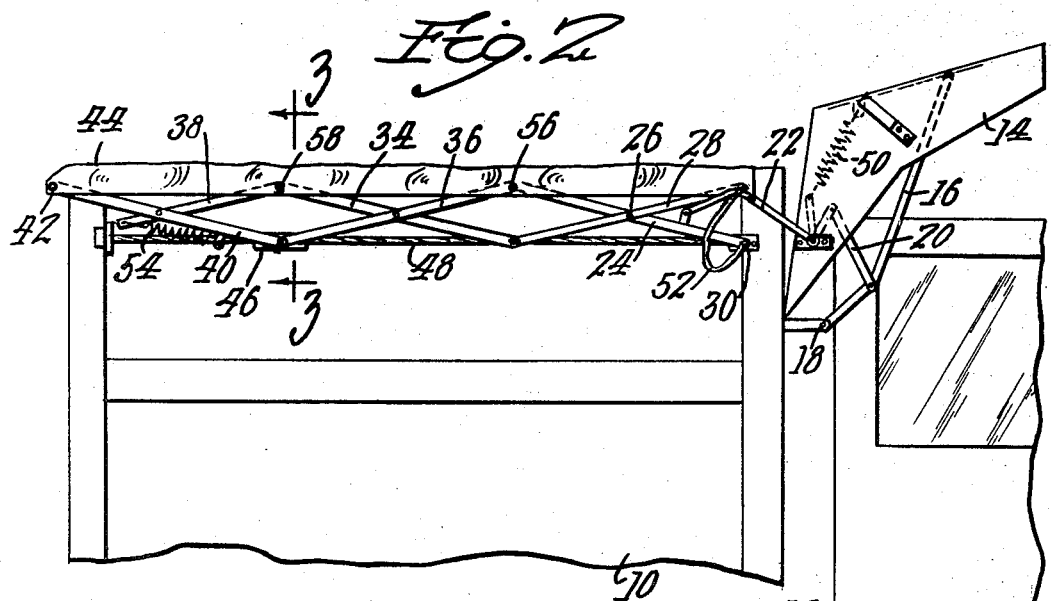
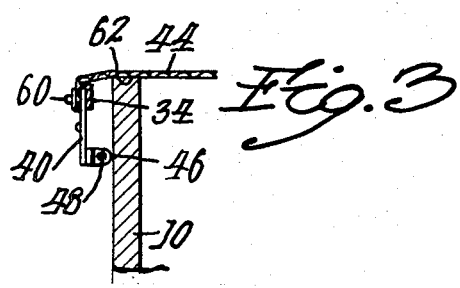
Inventor
Frank E. Morse, Jr.
By Charles P. Fay,
Attorney United States Patent Office 3,416,834
Patented Dec. 17, 1968

3,416,834
COVER CONSTRUCTION FOR OPEN
BODY TRUCKS
Frank E. Morse, Jr., 199 Prospect St.,
Auburn, Mass. 01501
Filed Apr. 3, 1967, Ser. No. 627,799
4 Claims. (Cl. 296—100)

ABSTRACT OF THE DISCLOSURE

Mechanism for extending a cover over an open truck body comprising a cover-attached lazy-tongs at each side of the truck body, said lazy-tongs being mounted only at the forward end of the body and including means for extending the lazy-tongs toward the rear so as to spread the attached cover out over the body, and to fold it at the forward end thereof. The cover is attached to the lazy-tongs at various points along the lazy-tongs as well as the extreme end so that the cover is thereby held down closely and tightly onto the open top of the truck body.

---

This invention relates to a new and improved cover construction for truck bodies and particularly for open bodies which are used to transport material apt to fall onto the highway. The principal object of the invention resides in the provision of a simplified construction of the class described including a flexible cover such as a tarpaulin, canvas or the like and extension means connected thereto for spreading the cover over the body of the truck in well defined held-down position therein while being foldable completely out-of-the way when not in use; and the provision of a lazy-tong extension construction for extending the cover where desired wherein there is no mechanism mounted on the sides of the truck body, there being only a taut cable or the like for guiding purposes and supporting the lazy-tongs in its extended relationship.

Other objects and advantages of the invention will appear hereinafter.

Reference is to be had to the accompanying drawings in which:

FIG. 1 is a view in side elevation illustrating a truck with the new cover apparatus mounted thereon in inoperative folded condition on the headboard of a truck;

FIG. 2 is a similar view showing the mechanism extended to spread the cover over the open body of the truck while holding the same down in position thereon, and FIG. 3 is a section on line 3—3 of FIG. 2 illustrating a manner in which the cover is connected to the cover extension apparatus and is held thereby in down position as desired.

In carrying out the invention, the reference numeral 10 indicates a truck body of any description having an open top. The cab of the truck is indicated at 12 and the headboard at 14. These parts are of course common and may assume many different forms.

The construction to be described is duplicated at each side of the truck although the handle for operating the mechanism which is indicated at 16 need not be so duplicated and it is to be understood that any means may be used for actuating the mechanism. In the case at hand, the handle 16 is merely raised from the inoperative position shown in FIG. 1 to the fully operative position shown in FIG. 2, but cranks, gearing or even power-operated means of any kind could be course be used for the same purpose.

In the present case, the handle has a free end and is pivoted at the opposite end at 18, which may represent a cross-shaft to actuate both cover mechanisms. There is a link 20 pivoted to the handle adjacent the shaft 18, the other end of which is pivoted to the short arm of a bell crank 22. The opposite end of the long arm of the bell crank is connected with respect to a member 24 pivoted at 26 to a similar member 28 to form the first series of a lazy-tongs and it will thus be clear that by moving the handle in a counterclockwise direction from the FIG. 1 position to the FIG. 2 position, the two members 24 and 28 will be extended from the folded or contracted position of the cover shown in FIG. 1 into the fully extended position thereof in FIG. 2.

The end of member 28 is attached to the canvas and is free of the truck body, and the corresponding end of member 24 is pivoted in a fixed location to the body of the truck as at 30. The opposite ends of these members are interpivoted with a like pair of crossed members 34, 36, these in turn being likewise secured to crossed end members 38 and 40. The number of linkages in the lazy-tongs depends on the length of the truck body. The end of link 40 as at 42 is utilizbed to connect to the extreme end of the overlying canvas cover 44 or other guide 48 extending the length of the truck body. The interconnection between the members 24 and 38 and 24 and 36 are not necessarily connected to the cable but should the lazy-tongs be extended to include more members, another guiding sleeve 46 on each of the cables would be desirable.

Various shock cards, springs or the like are utilized. One of these is illustrated at 50 to aid in the extension of the lazy-tongs, and shock cords as at 52 are utilized for a somewhat similar purpose and to make the action of folding and extending the lazy-tongs smoother. Also other springs may be used where desired as for instance at 54 which is connected between the end of member 38 which is shorter than 40, and to a part of the member 40.

Where the members 24 and 36 are connected as at 56, and where member 34 is connected to 38 as at 58, the canvas is conveniently secured with respect to these members by a pivot-pin, grommet and the like construction illustrated in FIG. 3 at 60.

Thus as the tarpaulin or canvas is extended by raising handle 16 and extending the lazy-tongs, the cover is held down over the top edge at 62 of the side of the truck body 10 as well as being held down securely at the extreme end of the truck as at 42. In this way the cover is extremely efficient and although different sizes should be applied to truck bodies of different lengths, the cover will always neatly and solidly fit down over covering the truck body completely and being unable to blow up in a breeze, etc. as would otherwise be possible.

It will be seen that the present invention provides a very efficient and economical device for quickly and easily spreading a truck cover out in closely associated relationship with respect to the top edge of the truck at the forward portion, the rear end or tail-gate, and the sides. The cover is just as easily retracted and there is no need for the operator to connect the top each time to the sides of the truck as is done in the prior art. Also, no mechanism is secured in exposed condition to the truck body side.

Having thus described my invention and the advantages thereof, I do not wish to be limited to the details herein disclosed, otherwise than as set forth in the claims, but what I claim is:

1. In combination with a vehicle having a headboard at the forward end thereof and with an opentop vehicle body including side and rear walls having their upper edges substantially even, a folding cover, an extensible lazy-tongs having an end mounted at the front end portion only of the body, said lazy-tongs being connected to the cover at spaced points, and extending to spread the cover over the body and to retract to rest with the cover on the headboard, means to extend and retract said linkage, said means being mounted on the headboard and including a handle at a side of the headboard, a longitudinal guide on a side of the body, and guiding means on a certain portion of the lazy-tongs in permanent engagement with said guide for guiding the lazy-tongs in its extension and retraction motions.

2. The combination of claim 1 including a connection between the extreme end of the lazy-tongs and the end of the cover, the cover being extended past the end of the rear wall of the body.

3. The combination of claim 1 wherein said lazy-tongs is completely folded in retracted position substantially off the body.

4. The combination of claim 1 wherein the guide and lazy-tongs are exposed at the side of the body, the cover extending down over the edges of the side walls.

References Cited

UNITED STATES PATENTS 1,926,757  9/1933  Tendergo _____ 296—117

FOREIGN PATENTS 943,503  12/1963  Great Britain.

BENJAMIN HERSH, *Primary Examiner.*

R. SONG, *Assistant Examiner.*